Figure 1:
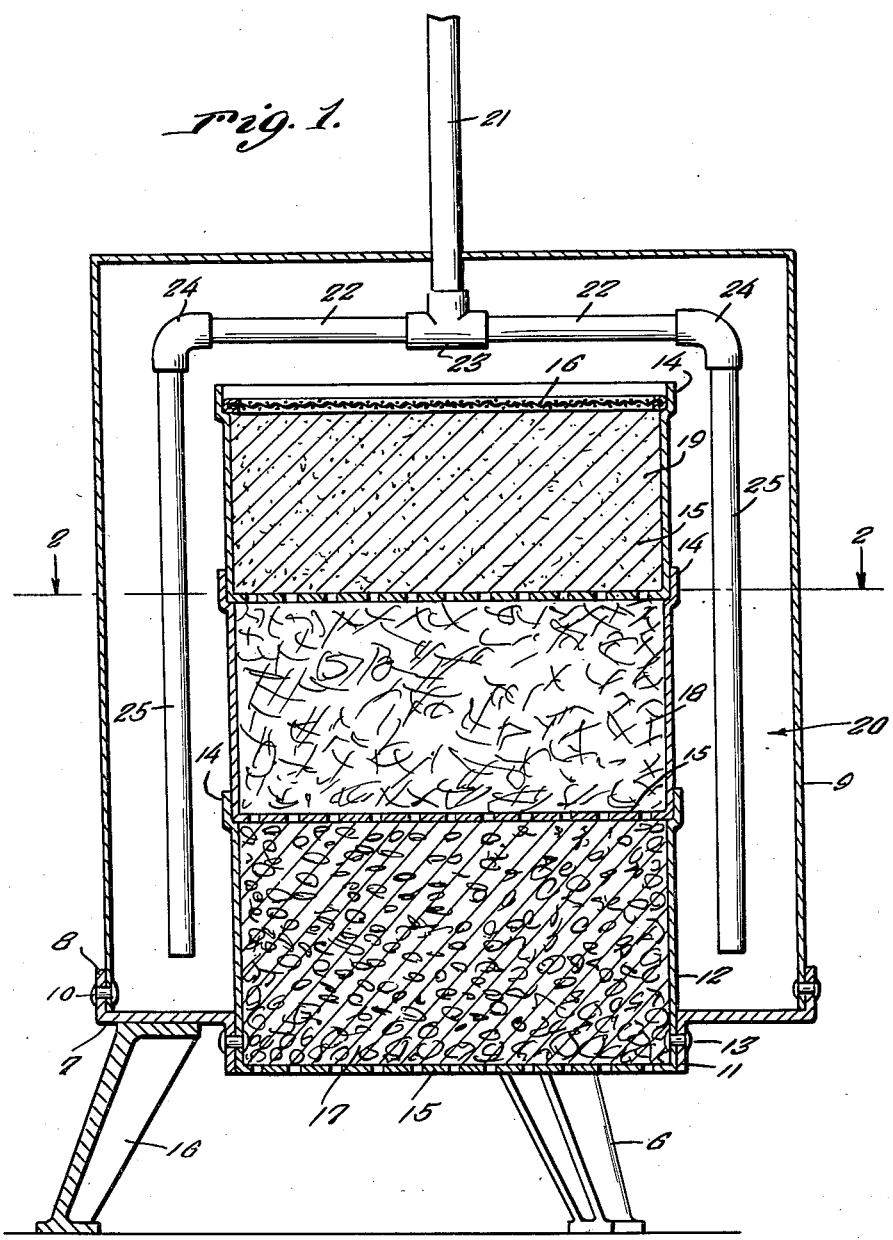

March 9, 1937. J. T. BROWN 2,072,848

WATER FILTERING AND PURIFYING DEVICE

Filed March 16, 1936 2 Sheets-Sheet 1

Inventor

J. T. Brown

By Clarence A. O'Brien and
Hyman Berman Attorneys

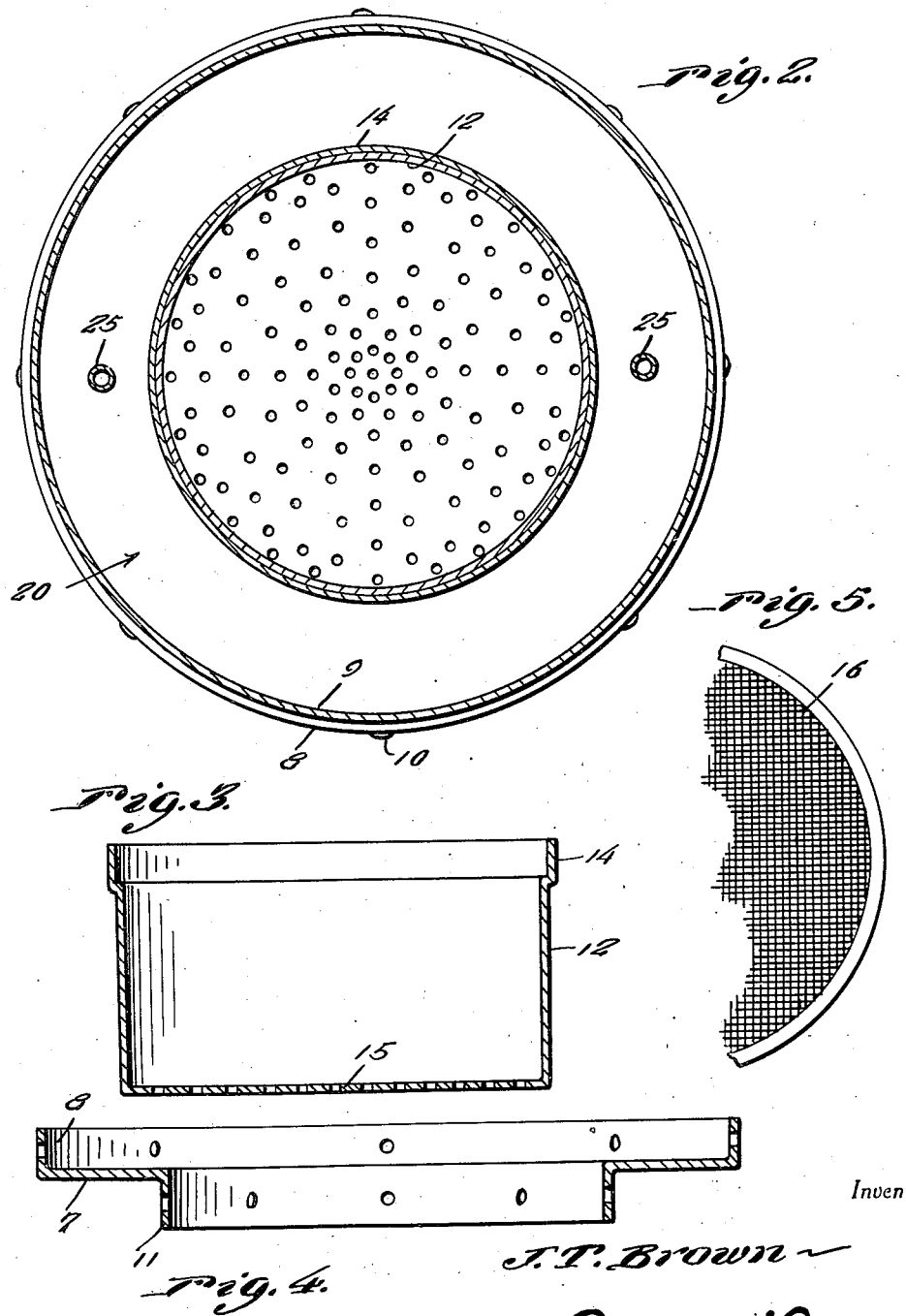

Patented Mar. 9, 1937

2,072,848

UNITED STATES PATENT OFFICE 2,072,848

WATER FILTERING AND PURIFYING DEVICE

James T. Brown, Detroit, Mich.

Application March 16, 1936, Serial No. 69,205

3 Claims. (Cl. 210—98)

This invention relates to that classification of prior art structures systematically grouped under the heading of filters, purifiers, and strainers for water and the like, and has reference in particular to a portable casing provided with an appropriate filter assembly and fluid intake and discharge means.

The specific field of invention to which the present development belongs is proportionately well-developed to the extent that it must be recognized that it is my general aim to improve upon such known and prior art arrangements as to provide noteworthy structural differences and refinements which serve to permit the resultant structure to perform with requisite certainty and efficiency believed to promote the progress of this particular art.

The specific improvements and their relative arrangements and association in the general assembly will become more readily apparent from the following description and drawings.

In the illustrative drawings, wherein like numerals are employed to designate corresponding details and parts throughout the same:

Figure 1 is a central vertical sectional view with portions appearing in elevation, showing a water purifying filter constructed in accordance with my idea, Figure 2 is a horizontal sectional view on the plane of the line 2—2 of Fig. 1, Figure 3 is a detail sectional view of one of the pan-like receptacle constituting one of the standardized sections of the sectional filtering core or cartridge, Figure 4 is a central section through the base forming annulus, Figure 5 is a fragmentary plan view of the removable fine mesh strainer screen.

Referring now to the drawings by distinguishing reference characters it will be observed that the device is portable and adapted to be placed in a stream or other body of water so that it may be sucked into the device and delivered therefrom by an appropriate piping and pumping system. The structure may be said to include a stand made up of appropriate supporting legs 6 attached to the base forming annulus. The annulus comprises an annular plate 7 secured to the legs and having an upstanding endless marginal rim 8 to which the lower upper end of the shell or casing 9 is riveted or otherwise fastened as indicated at 10. The centrally apertured portion of the annulus has depending therefrom a ring-like flange 11 which may be described as an adaptor for the sectional filtering unit. Incidentally, the unit is here shown as made up of three companion or complemental sections and each includes a standardized pan-like receptacle 12, the lower one of which is fitted telescopically in the ring or flange 11 and secured thereto as indicated at 13. The upper open end of the rim or wall of the pan is outwardly offset as indicated at 14. Moreover, the bottom of each part or pan as indicated at 15 is apertured to facilitate the passage of the water upwardly therethrough. The pans 12 are stacked together in superposed relation with the bottom of each pan fitting into the offset rim portion 14 of the underlying pan. The uppermost pan is provided with a removable strainer or screen 16 of appropriate mesh. The cup or pan 12 at the bottom is filled with crushed limestone 17, the next adjacent cup or pan is filled with coke 18 and the remaining one with relatively fine white sand 19.

These interconnected superposed cups or pans properly loaded with filtering materials, form a sort of a cartridge or core and this extends up in concentric relation within the closed top casing or cylinder 9. The respective diameter of the parts is such as to define a clear water space between the parts as indicated at 20.

The suction and delivery pipe 21 which is connected with an appropriate pump (not shown) extends down into the cylinder and has a yoke formed on its lower end. This yoke is made up of pipe sections 22 connected by a T-coupling 23 to the intake end of the suction pipe 21. At their outer ends these pipes 22 connect through the instrumentality of elbows 24 with depending intake branches whose intake ends are disposed close to the space or annulus 7.

In practice, the device is placed in a stream or other body of water and when the pump is turned on, sufficient suction is generated in the container to suck the water in through the lowermost filter cup or section. Obviously, as the column of water is "pulled" up through the filter it is successively or gradually reacted on by the filtering materials and virtually all impurities are removed therefrom. The clear water which overflows into the chamber 20 is sucked up through the branch pipe 25 and carried off through the pump line 21 to a suitable source of discharge.

As is evident the novelty is predicated upon the selection and mechanical coordination of parts wherein each part contributes its proportionate share to the final result, and wherein the cumulative effect of all parts enables the device to perform with requisite certainty and satisfaction.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

What I claim is:

1. In a structure of the class described, a stand comprising an annulus, supporting legs therefor, said annulus being formed with a central depending supporting flange and an upstanding marginal rim, a casing having its lower portion fitted in and attached to said rim, a filtering cartridge having its walls disposed inwardly of said depending flange and secured to said flange, said cartridge being apertured at the bottom to facilitate entry of water, said cartridge having its wall portions spaced concentrically from the wall portion of the casing in the manner and for the purposes described, a suction pipe extending into the casing and including a yoke having depending branches disposed in the water space between the cartridge and casing, said branches having their intake ends disposed close to said annulus.

2. In a water filtering and purifying device of the class described, a portable stand comprising an annulus, supporting legs therefor, said annulus having a central apertured portion provided with a depending annular flange, and having its marginal portion provided with an upstanding annular rim, a casing closed at its top and open at its bottom, said open bottom resting on said annulus within the limits of said rim, means attaching the bottom of the casing to said rim, a filtering cartridge arranged concentrically within the casing and spaced from the wall of said casing, said cartridge depending through the centrally apertured portion of said annulus and being secured to said depending flange, the bottom of the cartridge being apertured and disposed flush with the lower edge of said flange, and a suction pipe leading into said casing.

3. A water filtering and purifying device adapted to be submerged in a body of water comprising a stand having a base, a casing attached to said base, and a filtering cartridge attached to said base and rising concentrically in said casing and having its top terminating below the top of said casing, a substantially U-shaped suction pipe having its bight portion disposed in the space between the respective tops of the casing and cartridge, the branches of said U-shaped pipe extending down into the space between the cartridge and vertical wall of the casing, said branches being disposed on diametrically opposite sides of the cartridge, and a suction pump pipe extending into said casing through the top thereof and joined to the intermediate portion of the U-shaped pipe.

JAMES T. BROWN.